J. Good,

Coffin,

Nº 12,058.

Patented Dec. 12, 1854.

N. PETERS, PHOTO-LITHOGRAPHER, WASHINGTON, D. C.

UNITED STATES PATENT OFFICE.

JOHN GOOD, OF PHILADELPHIA, PENNSYLVANIA.

COFFIN.

Specification of Letters Patent No. 12,058, dated December 12, 1854.

*To all whom it may concern:*

Be it known that I, JOHN GOOD, of the city of Philadelphia, in the county of Philadelphia and the State of Pennsylvania, have invented a new and useful Improvement on Corpse-Preservers for the Preservation of Dead Bodies in Warm Weather Until Burial, said improvements consisting in certain additions to the apparatus now in use which tend to more effectually exclude the air from the corpse; and I do hereby declare that the following is a full and exact description of the same, reference being had to the accompanying drawings, making a part of this specification, in which—

Figure 2:
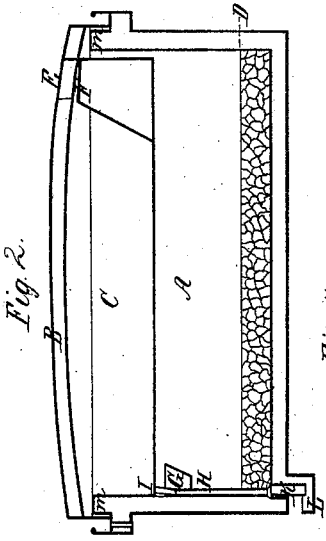
Figure 5:
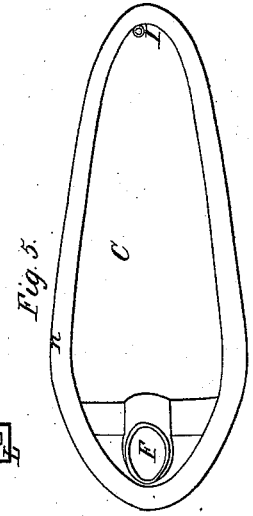
Figure 7:
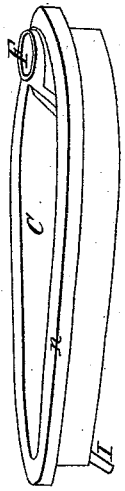
Figure 3:
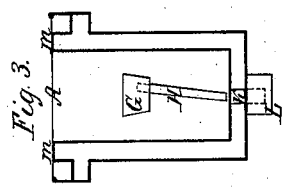
Figure 8:
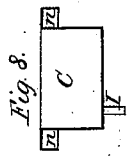
Figure 1:
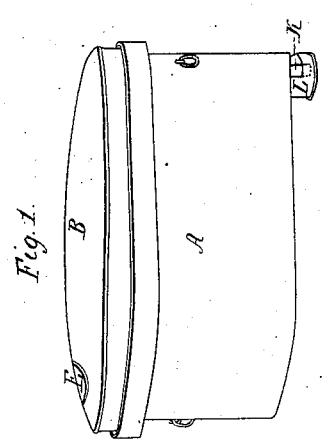
Figure 4:
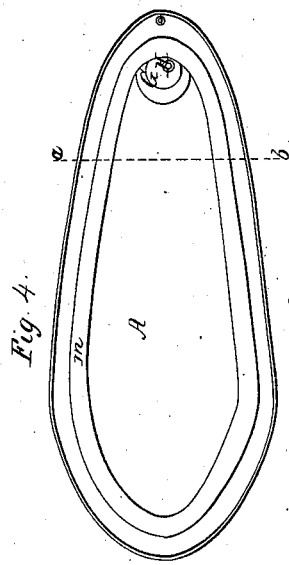
Figure 6:
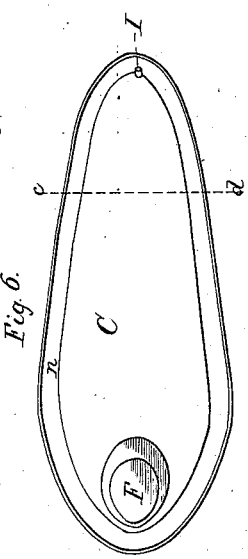

Figure 1, is a perspective view; Fig. 2, a longitudinal vertical section of the apparatus complete; Fig. 3, a transverse vertical section on the line $a\ b$; Fig. 4, a top plan of the case or box the lid and tray being removed; Fig. 5, a top plan of the tray; Fig. 6, a bottom plan, and Fig. 7, a perspective view of the same; Fig. 8, a transverse vertical section of the tray on the line $c\ d$.

Like letters refer to like parts.

Letter A, the box or case; B, the lid; C, ice tray; D, false bottom resting upon the ice, upon which is placed the corpse; E, glazed opening in the lid; F, glazed opening in the tray immediately under and corresponding with that in the lid; G, a reservoir, in shape like the frustum of a cone inverted and open at the top; H, a pipe carried above the bottom of the reservoir G, and extending downward to within a short distance of the bottom of the box or case; I, a pipe leading from the tray C, to the reservoir G, the extremity of said pipe being carried a little to one side, and below the top of the pipe H; K, a pipe in the bottom of the box of sufficient size to carry off the water from the melting ice in both tray and box; L, a reservoir under the box into which the pipe K discharges, said pipe being carried below the aperture of the reservoir L, is while immersed in the water. The object of this arrangement and also that of the pipe I being to exclude the air from the corpse, and thereby tend to its better preservation. The tray C, is made with a collar $h$, the use of said collar being to render the preserver air-tight when the lid is removed for the purpose of replenishing the ice in the tray, the collar being made to fit over that part of the box marked $m$, and resting in a gutter which is carried around the box, as shown in the drawing Fig. 4, the gutter being partly filled with water; The space below the false bottom D, in Fig. 2, is represented with ice in it; the top B, covering the whole forms with my improvements, a perfectly air-tight "corpse-preserver." The corpse preserver being made with double walls, and in all other respects, being precisely similar to those in use, I do not deem it necessary to give a full description of the same further than to state, that the hole marked "$h$" is rendered water tight by the insertion of a plug.

The operation of my improvements, is as follows. The lower portion of the case is filled with a sufficiency of ice, upon which the false bottom D, rests, upon this bottom the corpse is placed; the tray is then put in its place, as shown in Fig. 2, with ice in it; the lid B, being then placed over all; as the ice in the tray melts the water is carried off by means of the tube I, into the reservoir G, from which it escapes by means of the pipe H, the lower end of the pipe I, being below the upper end of the pipe H, is consequently immersed in the water. The water from the tray and box passes into the reservoir L, by means of the pipe K; the water escaping from the reservoir by means of the aperture as shown in Fig. 1, into any suitable vessel placed under to receive it. The pipes I and K having their lower ends immersed in the water, form what may aptly be termed a water-lock, thus preventing the entrance of the air, either from above or below, and thereby tending to the better preservation of the corpse.

I am aware that water valves and joints are in common use, and therefore do not claim these devices separately, but What I do claim and desire to secure by Letters Patent of the United States is—

The collar $h$, the reservoirs G, and L in connection with the pipes H, I, and K; the various parts being arranged and connected as set forth in the specifications and accompanying drawings and acting in manner and for the purpose, herein specified.

JOHN GOOD.

Witnesses:
JOHN B. KENNEY,
H. PHILLIPS.